United States Patent [19]

Shreve

[11] Patent Number: 4,951,314
[45] Date of Patent: Aug. 21, 1990

[54] LINE TILT COMPENSATION METHOD AND APPARATUS

[75] Inventor: Gregory A. Shreve, Redondo Beach, Calif.

[73] Assignee: TRW Inc., Redondo Beach, Calif.

[21] Appl. No.: 773,488

[22] Filed: Sep. 9, 1985

[51] Int. Cl.$^5$ .............................................. H04N 7/167
[52] U.S. Cl. .................................... 380/14; 380/10; 380/20
[58] Field of Search ................... 358/119, 114, 124; 380/10, 14, 20

[56] References Cited

U.S. PATENT DOCUMENTS

| | | | |
|---|---|---|---|
| 4,389,671 | 6/1983 | Posner et al. | 358/124 |
| 4,488,176 | 12/1984 | Bond et al. | 358/119 |
| 4,547,802 | 10/1985 | Fogarty et al. | 358/119 |
| 4,562,465 | 12/1985 | Glaab | 358/114 |

OTHER PUBLICATIONS

Baxes, Gregory A., "Digital Techniques Cure Line Segmentation Scrambling Problems," NCTA Technical Paper presented at Las Vegas Convention, Jun. 2-5, 1985, pp. 308-313.

Primary Examiner—Stephen C. Buczinski
Assistant Examiner—Melissa L. Koltak
Attorney, Agent, or Firm—Noel F. Heal; Sol L. Goldstein

[57] ABSTRACT

A method and apparatus that compensates for line tilt in a video line scrambled by a line spin scrambling technique. Line spin scrambling provides relatively secure transmission of video signals, with a modest amount of complexity and cost. However, line spin scrambling suffers from certain distortions that corrupt the unscrambled video signal. One of these distortions is caused by line tilt, and results in a chaotic hashing of luminance striations in a received picture. The method of the invention includes the steps of measuring the amplitude of the line tilt introduced into a video signal, generating a complementary ramp based on the measured amplitude, and summing the complementary ramp with the spun video line.

20 Claims, 2 Drawing Sheets

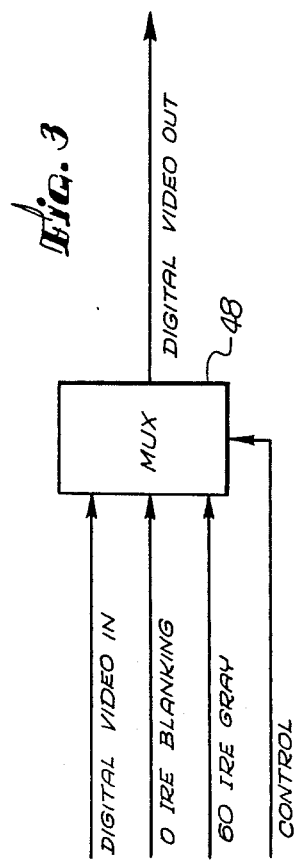

LINE TILT COMPENSATION METHOD AND APPARATUS

BACKGROUND OF THE INVENTION

This invention relates generally to techniques for scrambling and unscrambling a video signal and, more particularly, to techniques for compensating for distortions in a video signal caused by the scrambling and unscrambling of the video signal.

Secure transmission of video signals is becoming increasingly important with the growing use of video teleconferencing, cable TV and satellite TV transmissions, and with the advent of direct-broad-cast-satellite (DBS) transmission. Different techniques have been developed for providing various levels of video security, with corresponding levels of complexity and cost. One technique that provides a relatively secure video signal with a modest amount of complexity and cost is line spin, or line rotation, scrambling. Line spin scrambling is performed in an encoder by making a cut in the active portion of a video line at a breakpoint determined by a pseudorandom number generator. The two segments that result are then interchanged, while the horizontal and vertical synchronization and blanking intervals are left intact. After transmission and reception of the video signal, the signal is unscrambled in a decoder by reversing the line spin scrambling that was performed in the encoder. The breakpoint is determined in the decoder by a pseudorandom number generator that is identical and synchronized to the pseudorandom number generator in the encoder.

Unfortunately, line spin scrambling suffers from certain distortions that corrupt the unscrambled video signal. One of these distortions is caused by a sawtooth-shaped voltage error introduced into each line of video during demodulation of the video signal. The phase of the sawtooth waveform is such that a linear charge ramp occurs during the horizontal blanking interval, and a linear discharge ramp occurs during the active portion of the video line. The linear discharge ramp, or line tilt, will corrupt the active portion of any demodulated video signal, but the effect on a received picture is generally acceptable when the video signal has not been scrambled. This is because the amplitude and phase of the line tilt are approximately the same for all horizontal lines and, therefore, the effect across the received picture is constant in the vertical direction and is a gradual luminance variation in the horizontal direction. However, a video line that has been scrambled with the line spin technique has the full amplitude of the line tilt applied at a single point, where the two segments are pieced back together during line spin unscrambling. This causes a sharp luminance discontinuity that occurs at the randomly chosen breakpoint in each video line. The result is a chaotic hashing of luminance striations in the received picture. Accordingly, there has been a need for a technique that compensates for this type of distortion in the video signal. The present invention fulfills this need.

SUMMARY OF THE INVENTION

The present invention resides in a method and apparatus that compensates for line tilt in the active portion of a spun video line. Briefly, and in general terms, the method of the invention includes the steps of measuring the amplitude of the line tilt introduced into a video signal, generating a complementary ramp based on the measured amplitude, and summing the complementary ramp with the spun video line.

More specifically, in a presently preferred embodiment of the present invention, a dummy video line having a constant-amplitude active portion in the gray region of the luminance scale is transmitted at the bottom of each video field. At the television receiver, in a line spin decoder, the amplitude of the line tilt introduced into the dummy video line during demodulation of the video signal is measured. The line tilt amplitude is measured by accumulating the difference in amplitude between adjacent points sampled across the active portion of the dummy video line. The line tilt amplitude is then filtered with a low-pass filter to remove noise. A linear complementary ramp is generated based on the line tilt amplitude, which is then summed with each video line in the following field. At the end of the following field, an updated line tilt amplitude is measured, filtered and used to generate an updated complementary ramp. The dummy video line can be replaced by a previous video line for display on a television monitor. However, this is not required, because the dummy video line is transmitted at the bottom of each field and, therefore, is not visible on the television monitor.

It will be appreciated from the foregoing that the present invention provides a highly accurate, yet simple, method and apparatus that compensates for line tilt in the active portion of a spun video line. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 3 is a diagram of a multiplexer for inserting a dummy video line into a video signal; and FIG. 4 is a detailed diagram of the line tilt compensation circuit.

DESCRIPTION OF THE PREFERRED EMBODIMENT

Figure 1:
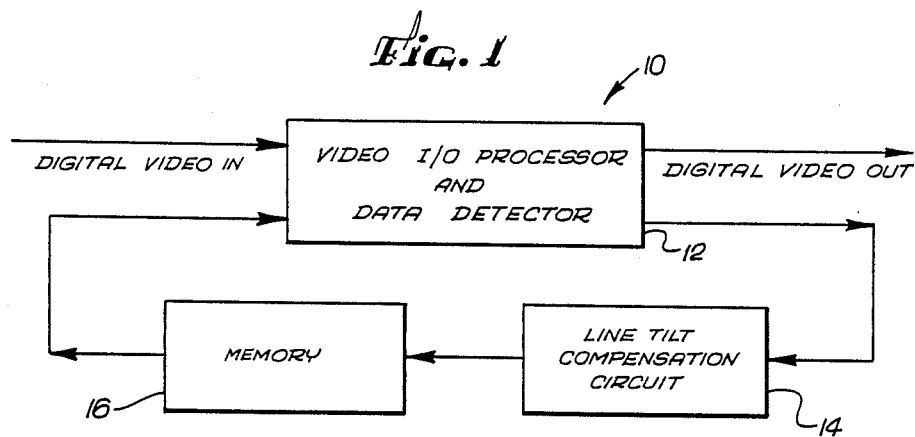
FIG. 1 is a block diagram of a line spin decoder showing the basic subsystem components, including a line tilt compensation circuit.

As shown in the drawings for purposes of illustration, the present invention is embodied in a method and apparatus that compensates for line tilt in the active portion of a video line scrambled by a line spin scrambling technique. Line spin scrambling is performed by making a cut in the active portion of a video line at a breakpoint determined by a pseudorandom number generator. The two segments that result are then interchanged. Line spin scrambling provides a relatively secure video signal, with a modest amount of complexity and cost, but suffers from certain distortions that corrupt the unscrambled video signal. One of these distortions is caused by line tilt, a ramp-shaped voltage error that corrupts the active portion of each line of video during demodulation of the video signal. This distortion appears in the received picture as a chaotic hashing of luminance striations.

In accordance with the method of present invention, the line tilt is corrected by measuring the amplitude of the line tilt introduced into the video signal, generating a complementary ramp based on the measured amplitude, and then summing the complementary ramp with the spun video line. In a presently preferred embodiment of the present invention, the amplitude of the line tilt is measured by transmitting at the bottom of each video field a dummy video line having a constant-amplitude active portion in the gray region of the luminance scale. At the television receiver, in a line spin decoder, the amplitude of the line tilt introduced into the dummy video line during demodulation of the video signal is measured. The line tilt amplitude is measured by accumulating the difference in amplitude between adjacent points sampled across the active portion of the dummy video line.

FIG. 1 illustrates a line spin decoder 10 that compensates for line tilt and unscrambles the spun video line. At a television receiver, a spun video signal is received, demodulated, digitized and entered into the line spin decoder 10. In the line spin decoder 10, a video input-/output (I/O) processor and data detector 12 receives the digitized spun video signal, a line tilt compensation circuit 14 performs the line tilt compensation, and a memory 16 performs the unscrambling. The corrected and unscrambled digitized video signal is output from the line spin decoder 10 by the video I/O processor and data detector 12. The digitized video signal is then converted back into analog form for display on a television monitor.

More specifically, the spun video signal is digitized by an 8-bit analog-to-digital converter (not shown) at a sampling rate of 14.32 MHz, which is four times the NTSC (National Television System Committee) color subcarrier frequency of 3.58 MHz. The video I/O processor and data detector 12 receives the 8-bit digitized spun video from the analog-to-digital converter. The digitized spun video signal is then entered into the line tilt compensation circuit 14 for measurement and correction of line tilt. The output of the line tilt compensation circuit 14 is a 10-bit corrected spun video signal. The 10-bit corrected spun video signal is unscrambled in memory 16 by writing the two segments of the scrambled video signal into the memory 16 and reading the two segments of the scrambled video signal from the memory in reverse order. The digitized video signal is output from the line spin decoder 10 by the video I/O processor and data detector 12 and converted back into analog form by a 10-bit digital-to-analog converter (not shown) for display on a television monitor (not shown).

Figure 2A:
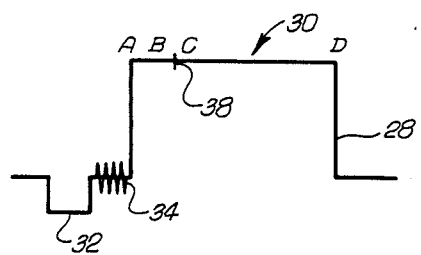
FIGS. 2A–2F are voltage-time graphs of a video line before and after line spin scrambling, demodulation, line tilt compensation, and line spin unscrambling.
Figure 2B:
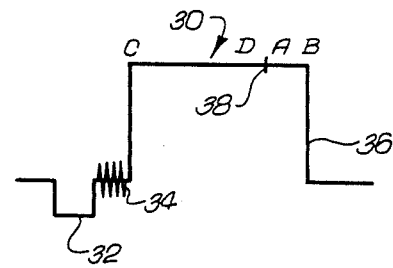

FIGS. 2A through 2F illustrate the voltagetime graphs of a video line before and after line spin scrambling, demodulation, line tilt compensation, and line spin unscrambling. FIG. 2A illustrates a video line 28 having a constant-amplitude active portion 30, which is the portion between points A and D. Also shown are a horizontal blanking interval 32 and an eight-cycle color burst 34. FIG. 2B illustrates a spun video line 36, which results from line spin scrambling video line 28 in an encoder. Line spin scrambling involves making a cut in the active portion 30 of the video line 28 at a breakpoint 38. The breakpoint 38 is determined by a pseudorandom number generator in the encoder. The resulting two segments, AB and CD, are interchanged, as shown in FIG. 2B. The horizontal blanking interval 32 and the color burst 34 are left intact.

Figure 2C:
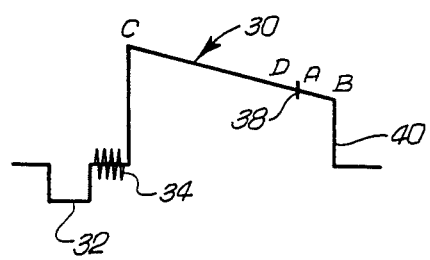
Figure 2D:
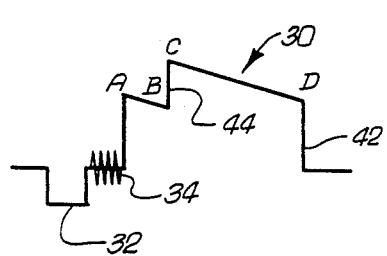
Figure 2E:
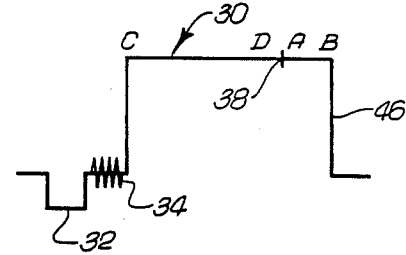
Figure 2F:
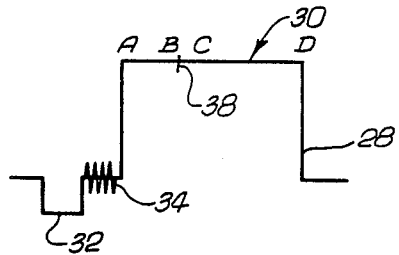

The spun video line 36 is then transmitted to a television receiver. During demodulation of the transmitted video signal at the television receiver, the active portion of the spun video line 36 is corrupted by line tilt. A corrupted spun video line 40 is shown in FIG. 2C. If the corrupted spun video line 40 is unscrambled in the line spin decoder 10, without compensation for line tilt, an uncompensated despun video line 42 results, as shown in FIG. 2D. As can be seen in FIG. 2D, the uncompensated despun video line 42 has a luminance discontinuity 44, which, because of its random nature across the active portion of each video line, would result in a chaotic hashing of luminance striations in the received picture. However, if the line tilt is corrected in the line tilt compensation circuit 14, a compensated spun video line 46 results, as shown in FIG. 2E. Unscrambling the compensated spun video line 46 reproduces the original video line 28, as shown in FIG. 2F.

Line spin unscrambling is performed in the preferred embodiment of the present invention simply by writing the compensated spun video line 46 into memory 16, segment CD followed by segment AB, and reading the compensated spun video line 46 from memory in the reverse order, segment AB followed by segment CD. The breakpoint 38 is determined in the decoder 10 by a pseudorandom number generator that is identical and synchronized to the pseudorandom number generator in the encoder.

As illustrated in FIG. 3, the dummy video line is inserted at the bottom of each video field, prior to transmission of the scrambled video signal, by a multiplexer 48. A 10-bit digitized input video signal is received by the multiplexer 48. The digitized input video signal includes a series of video frames, each video frame having two interlaced video fields. Each video frame has 525 digitized video lines, and, therefore, each video field has 262½ digitized video lines. The 525 video lines in each video frame are indexed from 1 to 525. A multiplexer control signal is generated when a designated video line, near the bottom of the video field, has been received by the multiplexer 48, as indicated by the index of the designated video line. The control signal causes a digitized dummy video line to be inserted by the multiplexer 48 into the digitized output video signal in place of the designated video line.

The dummy video line is generated by a zero IRE (Institute of Radio Engineers) units signal and a sixty IRE units signal. The zero IRE units signal is full-scale black on the luminance scale and forms the horizontal blanking interval of the dummy video line. The sixty IRE units signal is in the gray region of the luminance scale (100 IRE units is full-scale white) and forms the constant-amplitude active region of the dummy video line. The control signal also controls the relative timing of the zero and sixty IRE units signals. The resulting dummy video line is similar to the video line 28 depicted in FIG. 2A, without the color burst.

FIG. 4 shows a detailed diagram of the line tilt compensation circuit 14, which includes, in series, a dummy video line selector 60, a line tilt amplitude detector 62, a low-pass filter 64, and a ramp generator 66. The dummy video line selector 60 singles out the digitized dummy video line from the digitized video signal so that line tilt in just the dummy video line can be measured. The line tilt amplitude detector 62 measures the amplitude of the line tilt. The low-pass filter 64 filters noise from the amplitude measurement. The ramp generator 66 generates a linear complementary ramp based on the measured amplitude, which is summed with a spun video line to compensate for line tilt.

More specifically, an 8-bit digitized spun video signal is entered into the line tilt compensation circuit 14 and into the dummy video line selector 60 from the video I/O processor and data detector 12. The dummy video line selector 60 singles out the dummy video line from the spun video signal in the same fashion as the dummy video line is inserted into the spun video signal by the multiplexer 48. When the designated video line carrying the dummy video line is indicated by the index of the designated video line, the digitized dummy video line is output from the dummy video line selector 60, sample by sample, to the line tilt amplitude detector 62.

The line tilt amplitude detector 62 measures the amplitude of the line tilt. The line tilt amplitude is measured by accumulating the difference in amplitude between adjacent points sampled across the active portion of the dummy video line. The amplitude differentials between the sampled points are measured in a differencing circuit 70. The differencing circuit 70 includes a flip flop 72, driven by a ramp clock 74, in parallel with the output of the dummy video line selector 60. Each pulse of the ramp clock 74 transfers the output of the dummy video line selector 60 to the output of the flip flop 72. The output of the dummy video line selector 60 is the digitized value of the amplitude of the dummy video line at a present sampling point and the output of the flip flop 72 is a one sample old value. The one sample old value is subtracted from the present value at adder 78 to generate the amplitude differential between the two points, which is the output of the differencing circuit 70. The ramp clock 74, in the presently preferred embodiment, is a train of 44 pulses and, therefore, 44 amplitude differentials are computed across the active portion of the dummy video line.

The amplitude differentials output by the differencing circuit 70 are accumulated, or integrated, in an accumulator 82. The accumulator 82 includes a flip flop 84, which is driven by a ramp clock 86. The accumulation is performed by summing the output of the accumulator 82 with the amplitude differential output by the differencing circuit 70 at an adder 90. The ramp clock 86 is also a train of 44 pulses, but delayed by one pulse with respect to the ramp clock 74 to achieve the proper timing between the differencing circuit 70 and the accumulator 82. When the 44 amplitude differentials have been summed, the output of the accumulator 82 represents the measured value of the line tilt amplitude (R). A begin dummy line signal 92 clears the accumulator 82 when a new dummy line has been entered into the line tilt compensation circuit 14.

The line tilt amplitude (R) measurement output by the accumulator 82 is scaled in a scale block 94. In scale block 94, the line tilt amplitude (R) is divided by the number of samples used to generate R. The division results in a line tilt amplitude slope ($\Delta R$). The value of $\Delta R$ is multiplied by minus one to form the complement of $\Delta R$, thereby allowing for the generation of the complementary ramp. The value of $-\Delta R$ is latched into a flip flop 95 by an end dummy line clock 96, which transmits a clock pulse at the end of the active portion of the dummy video line. The value of $-\Delta R$ is then filtered by the low-pass filter 64 to filter noise from the measurement.

The line tilt amplitude slope ($-\Delta R$) output by the low-pass filter 64 is applied to the ramp generator 66 to generate a linear complementary ramp, which is then summed, sample by sample, with the corresponding sample of the 8-bit digitized spun video signal at an adder 98 to generate a 10-bit corrected spun video signal. The two additional bits allow for the addition of the two signals without overflow. The ramp generator includes a flip flop 100, driven by the ramp clock 86, and an adder 101. The ramp generator 66 is identical in function to the accumulator 82 and generates the complement of the filtered output of the accumulator 82. The ramp generator 66 is cleared by a composite blanking interval signal 102, so that the ramp is summed only with the active portion of a spun video line, and not with the horizontal and vertical blanking intervals. The dummy video line can be removed from the 8-bit spun video signal and replaced by a previous video line for display on a television monitor by a replace dummy video line block 104. However, this is not required, because the dummy video line is transmitted at the bottom of each field and, therefore, is not visible on the television monitor.

From the foregoing, it will be appreciated that the present invention provides a highly accurate, yet simple, method and apparatus that compensates for line tilt in the active portion of a spun video line. Although a preferred embodiment of the invention has been shown and described, it will be apparent that other adaptations and modifications can be made without departing from the spirit and scope of the invention. For example, one such modification might include measuring the amplitude of the line tilt in each video line. This measurement might be made by introducing a guard strip at the ends of the active portion of each video line and, after demodulation, measuring the amplitude differential between the guard strips. Accordingly, the invention is not to be limited, except as by the following claims.

I claim:

1. A line tilt compensation method that compensates for line tilt in the active portions of video lines, comprising the steps of:

measuring the amplitude of the line tilt in the active portion of a video line;

generating a complementary ramp based on the measured amplitude; and summing the complementary ramp with the active portion of at least one of the video lines.

2. The line tilt compensation method of claim 1, wherein the step of measuring line tilt amplitude includes the steps of:

transmitting a dummy video line having a constant-amplitude active portion;

receiving the dummy video line; and measuring the amplitude differential between the ends of the active portion of the dummy video line.

3. The line tilt compensation method of claim 2, and further including the step of:

replacing the dummy video line with a previous video line for display of the video signal on a television monitor.

4. The line tilt compensation method of claim 2, and further including the step of:

filtering the line tilt amplitude with a lowpass filter.

5. The line tilt compensation method of claim 1, wherein the step of measuring line tilt amplitude includes the steps of:

transmitting at the bottom of each video field a dummy video line having a constant-amplitude active portion in the gray region of the luminance scale;

receiving the dummy video line; and measuring the amplitude differential between the ends of the active portion of the dummy video line.

6. The line tilt compensation method of claim 5, and further including the step of:
   replacing the dummy video line with a previous video line for display of the video signal on a television monitor.

7. The line tilt compensation method of claim 5, and further including the step of:
   filtering the line tilt amplitude with a lowpass filter.

8. The line tilt compensation method of claim 5, wherein the step of measuring the amplitude differential includes the steps of:
   measuring the difference in amplitude between adjacent points sampled across the active portion of the dummy video line; and
   accumulating the amplitude differentials.

9. The line tilt compensation method of claim 8, and further including the step of:
   replacing the dummy video line with a previous video line for display of the video signal on a television monitor.

10. The line tilt correction method of claim 8, and further including the step of:
    filtering the amplitude of the line tilt with a low-pass filter.

11. A line tilt compensation apparatus that compensates for line tilt in the active portions of video lines; comprising:
    means for measuring the amplitude of the line tilt in the active portion of a video line;
    means for generating a complementary ramp based on the measured amplitude; and
    means for summing the complementary ramp with the active portion of at least one of the video lines.

12. The line tilt compensation apparatus of claim 11, wherein the means for measuring line tilt amplitude includes:
    means for transmitting a dummy video line having a constant-amplitude active portion;
    means for receiving the dummy video line; and
    means for measuring the amplitude differential between the ends of the active portion of the dummy video line.

13. The line tilt compensation apparatus of claim 12, and further including:
    means for replacing the dummy video line with a previous video line for display of the video signal on a television monitor.

14. The line tilt compensation apparatus of claim 12, and further including:
    means for filtering the line tilt amplitude with a lowpass filter.

15. The line tilt compensation apparatus of claim 11, wherein the means for measuring line tilt amplitude includes:
    means for transmitting at the bottom of each video field a dummy video line having a constant-amplitude active portion in the gray region of the luminance scale;
    means for receiving the dummy video line; and
    means for measuring the amplitude differential between the ends of the active portion of the dummy video line.

16. The line tilt compensation apparatus of claim 15, and further including:
    means for replacing the dummy video line with a previous video line for display of the video signal on a television monitor.

17. The line tilt compensation apparatus of claim 15, and further including:
    means for filtering the line tilt amplitude with a lowpass filter.

18. The line tilt compensation apparatus of claim 15, wherein the means for measuring the amplitude differential includes:
    means for measuring the difference in amplitude between adjacent points sampled across the active portion of the dummy video line; and
    means for accumulating the amplitude differentials.

19. The line tilt compensation apparatus of claim 18, and further including:
    means for replacing the dummy video line with a previous video line for display of the video signal on a television monitor.

20. The line tilt compensation apparatus of claim 18, and further including:
    means for filtering the line tilt amplitude with a lowpass filter.

* * * * *